Jan. 14, 1930.  F. HUBER  1,743,549
MOTOR VEHICLE
Filed Dec. 30, 1926   3 Sheets-Sheet 1
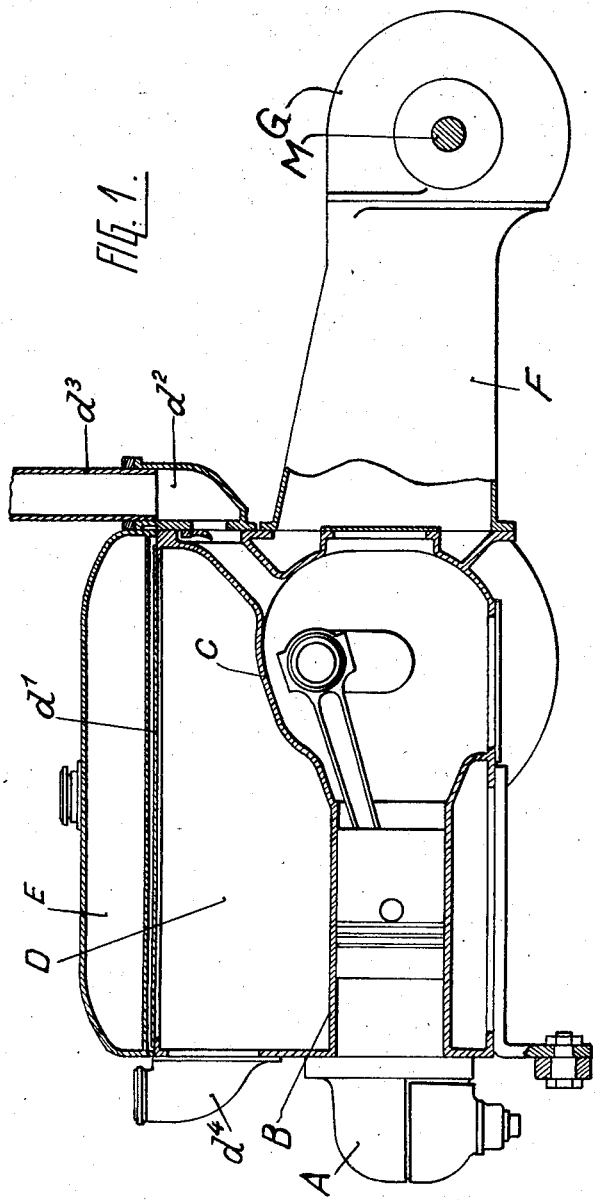

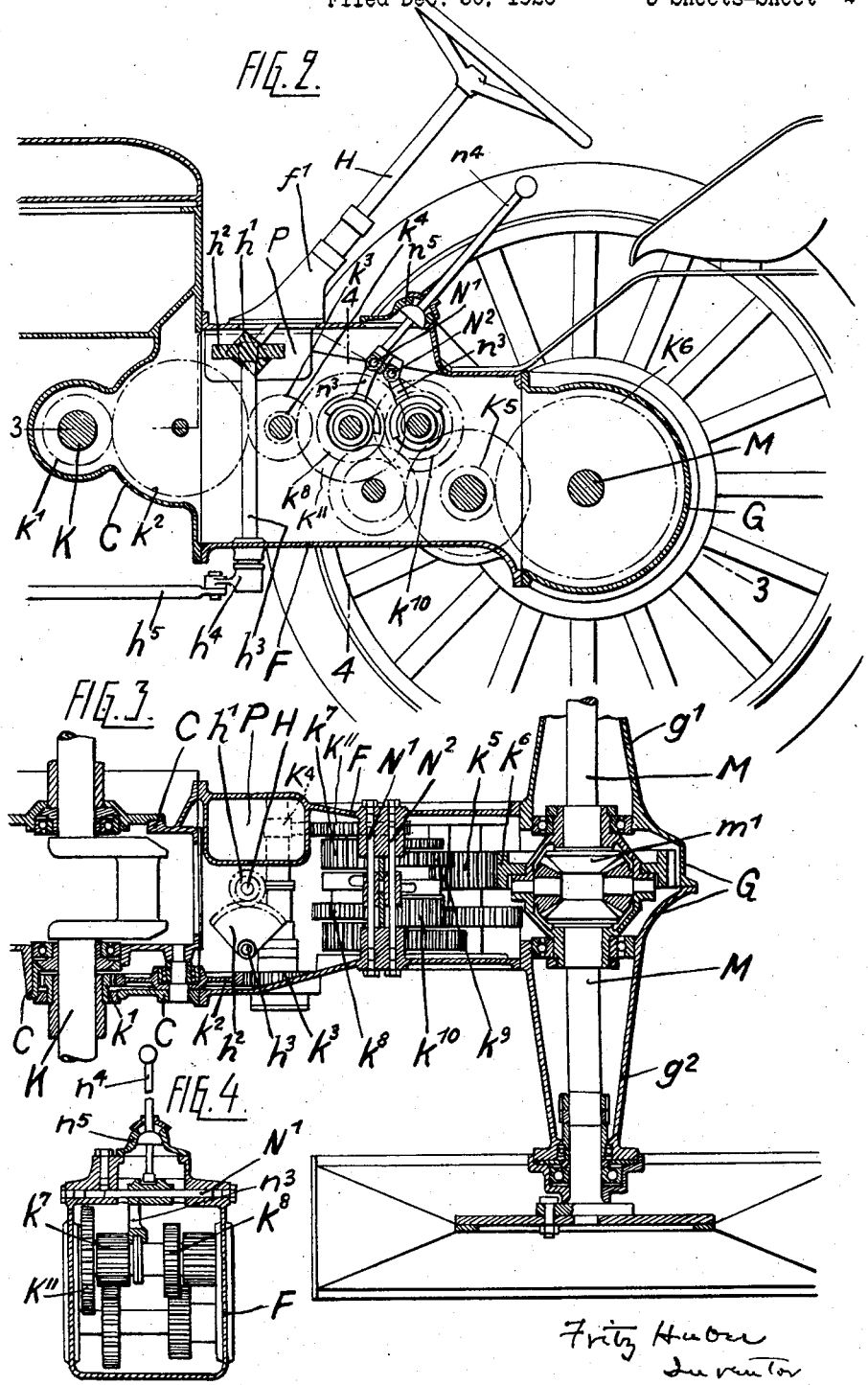

Jan. 14, 1930.   F. HUBER   1,743,549
MOTOR VEHICLE
Filed Dec. 30, 1926   3 Sheets-Sheet 3

Patented Jan. 14, 1930

1,743,549

UNITED STATES PATENT OFFICE

FRITZ HUBER, OF MANNHEIM, GERMANY, ASSIGNOR TO HEINRICH LANZ AKTIENGE-SELLSCHAFT, OF MANNHEIM, GERMANY, A CORPORATION OF GERMANY

MOTOR VEHICLE

Application filed December 30, 1926, Serial No. 157,975, and in Germany February 9, 1926.

This invention relates to motor vehicles of the type operated by a horizontal engine, and the object thereof is to simplify, cheapen and otherwise improve the construction of such vehicles.

One practical embodiment of the invention is shown, by way of illustration and not of limitation, in the accompanying drawings, in which—

Figure 5:
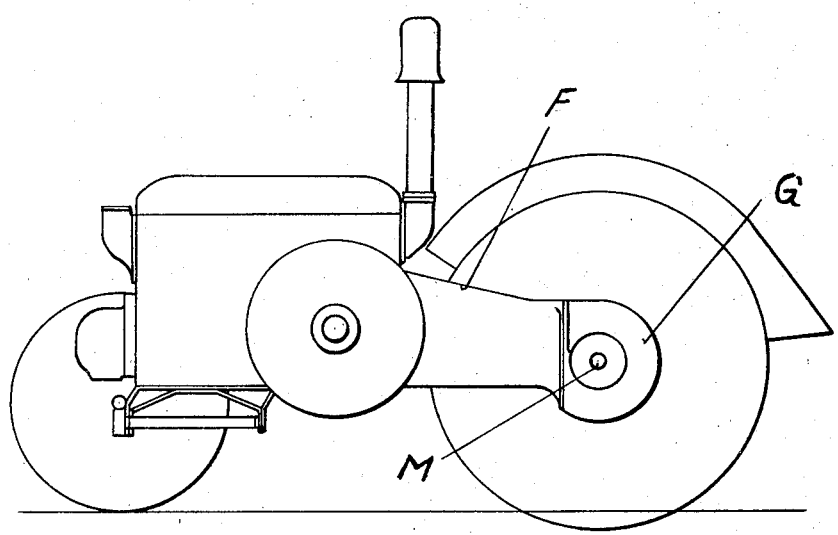
Figure 6:
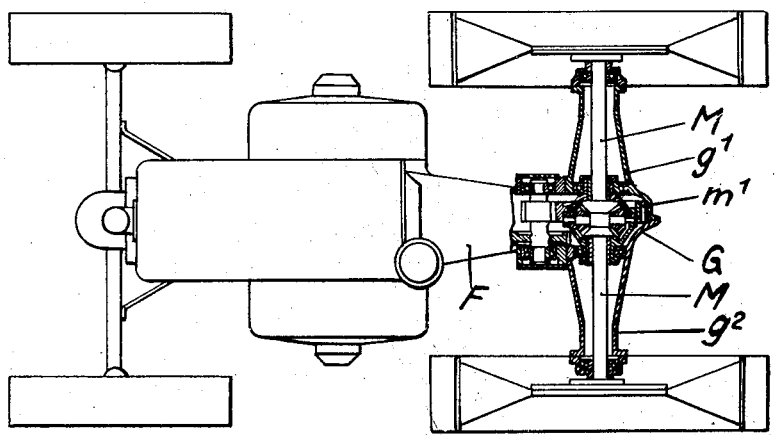

Figure 1 is essentially a longitudinal section through the motor casing of the vehicle; Fig. 2 is a similar section through the gear casing; Fig. 3 is a section on the line 3—3 of Fig. 2, as seen from above; Fig. 4 is a section on the line 4—4 of Fig. 2, looking from the left; and Figs. 5 and 6 are views showing the motor vehicle on a reduced scale in side elevation and partially in plan and partially in section, respectively.

Referring to the drawings, A is the cylinder head, B is the cylinder, and C is the crankcasing of the horizontal motor. The motor cylinder and the crank-casing, as well as a chamber D which serves for the reception of water for cooling the cylinder and which extends over both the cylinder and the entire upper side of the crank-casing, are united integrally in a single casting. A fuel container E, which may also be formed as a part of the same casting but which as shown is constructed as a separate part, is located directly over the cooling water chamber and is separated therefrom by a partition $d^1$.

To the rear end wall of the motor casting is attached, in substantial alignment with the crank-casing, a gear-casing which is divided into a forward section F, containing the steering mechanism and the change speed and reversing gears, and a rear section G containing the two stubs of the rear drive wheel axle M and interposed differential gearing $m^1$. In addition, there is attached to the rear end wall of the casting, above the gear-casing, a hollow elbow-piece $d^2$ which is in communication with the interior of the crank-casing and carries an air-inlet pipe $d^3$ and to its front end wall, above the cylinder head and in communication with the cooling water chamber, a somewhat similar elbow-piece $d^4$ provided at its upper end with a screw-threaded cap and serving for filling this chamber with water.

The forward section F of the gear-casing carries, attached to its upper wall, a steering-block $f^1$ in which is seated the shaft H of the steering-wheel. The steering shaft carries at its lower end a worm $h^1$ meshing with a worm wheel or sector $h^2$ which in turn is fixed to a vertical shaft $h^3$ journaled in the lower wall of the casing, and to the lower end of this shaft, below the casing, there is fixed a lever-arm $h^4$ which is pivotally connected with and actuates the steering thrust-rod $h^5$. The rear wheel axle M is driven from the crank-shaft K of the motor through the spur-wheels $k^1$ $k^2$ $k^3$ $k^4$ $k^{11}$, change and direction gears providing three forward speeds and one reverse or back speed, the two spur-wheels $k^5$ $k^6$, and the differential gear $m^1$, all of which, with the exception of the spur-wheels $k^1$ $k^2$ and the differential gear, are as shown journaled in the walls of this section of the gear casing. For the control of the change and direction gears there are journaled in the casing, to slide axially, two rods $n^1$ and $n^2$ each of which carries fixed thereto an arm $n^3$, and each arm $n^3$ is operatively connected with one of the gear couples $k^7$ $k^8$ and $k^9$ $k^{10}$ of the change gears so that these gears may be shifted from time to time as desired through a suitable displacement of these two rods, which displacement is effected manually by means of the switch-lever $n^4$ journaled by a ball and socket joint in a seat $n^5$ on the casing to swing in all directions. This casing section is further provided with an oil receptacle P which is formed as an integral part thereof. Thus, as is seen, that part of the gear-casing which contains the change and direction gears carries not only the entire steering device, up to the thrust-rod, but also all of the control mechanism for these gears and, in addition, a tank for oil.

The rear section G of the gear-casing is, in turn, divided centrally into two like lateral portions $q^1$ and $q^2$, each of which provides a housing for one of the two stubs of the axle M. These two sections are joined directly together, and the differential gear $m^1$ is journaled between them.

The following may be mentioned as among the advantages of the construction disclosed. By the extension of the cooling water chamber from the cylinder back over the entire upper side of the crank-casing the water therein is given a relatively large surface, with the result that the steam forming on the cooling of the cylinder carries off relatively little water and consequently the water loss is kept low; and, furthermore, a most efficient preheating of the fuel in the fuel tank is obtained by reason of the location of this tank directly over the extended upper surface of the water chamber. Again, due to the fact that the forward section of the gear-casing carries all the main elements of the steering device and all of the change and reversing gears and control mechanism, it is possible to assemble motors and gear-casings made, for example, in different special shops without the careful fitting together of the steering and transmission parts and without the accurate adjustments heretofore acquired. The division made in the gear-casing itself, moreover, greatly facilitates the construction and assembly of the various gears. A final result is that the interchangeability of parts necessary for mass production is solved in the simplest possible manner.

What I claim as new, and desire to secure by Letters Patent, is—

1. A horizontal gas engine for motor vehicles and the like comprising a motor cylinder, a crank casing, and a cooling water chamber for the cylinder extending back therefrom over the crank casing, and a fuel tank located directly over and extending substantially the entire length of the cooling water chamber.

2. A horizontal gas engine for motor vehicles and the like comprising a motor cylinder, a crank casing, a cooling water chamber for the cylinder having a substantially horizontal upper surface extending the length of the cylinder and back therefrom over the upper surface of the crank casing, and a fuel tank located directly on and extending substantially the full length of the cooling water chamber, the main parts of said cylinder, crank casing and water chamber being integrally united in a single casting.

3. A motor vehicle of the type described, comprising a horizontal motor cylinder, a crank casing, a cooling water chamber for the cylinder extending back therefrom over the crank casing, a fuel tank located upon and substantially covering the entire water-cooling chamber, the main portions of the said cylinder, crank-casing and water chamber being formed as an integral casting providing at the rear outer end of the crank casing a plane vertical face for the attachment thereto of an air inlet pipe and a gear casing.

Dr. Ing. FRITZ HUBER.